United States Patent
Graham et al.

(10) Patent No.: US 7,726,236 B2
(45) Date of Patent: *Jun. 1, 2010

(54) SANDWICH MAKER

(75) Inventors: Peter G. Graham, Lucas, TX (US); Todd W. Craig, Frisco, TX (US)

(73) Assignee: Pizza Hut, Inc., Dallas, TX (US)

( * ) Notice: Subject to any disclaimer, the term of this patent is extended or adjusted under 35 U.S.C. 154(b) by 437 days.

This patent is subject to a terminal disclaimer.

(21) Appl. No.: 11/692,663

(22) Filed: Mar. 28, 2007

(65) Prior Publication Data

US 2008/0196597 A1      Aug. 21, 2008

Related U.S. Application Data

(63) Continuation-in-part of application No. 11/708,260, filed on Feb. 20, 2007.

(51) Int. Cl.
*A21C 9/06* (2006.01)

(52) U.S. Cl. .................... 99/450.1; 99/450.8

(58) Field of Classification Search ........... 99/444–446, 99/326–333, 341, 349–351, 352–355, 372–384, 99/422–425, 400, 401, 450.1–450.8, 421, 99/426, 427, 430; 219/446.1, 448.11, 450.1, 219/451.1, 447.1, 524, 538
See application file for complete search history.

(56) References Cited

U.S. PATENT DOCUMENTS

| | | | |
|---|---|---|---|
| 4,574,088 A | 3/1986 | Bowden | |
| 5,622,742 A | 4/1997 | Carollo | |
| 5,809,871 A * | 9/1998 | Arathoon | 99/380 |
| 5,983,784 A * | 11/1999 | Goldberg | 99/382 |
| 6,247,392 B1 * | 6/2001 | Yung | 99/340 |
| 6,397,730 B1 * | 6/2002 | Steinbach et al. | 99/331 |
| 6,429,409 B1 * | 8/2002 | Siu | 219/450.1 |
| 2005/0175743 A1 | 8/2005 | Lauen et al. | |
| 2006/0006581 A1 | 1/2006 | St. Germain et al. | |
| 2006/0123997 A1 | 6/2006 | Hubener | |

OTHER PUBLICATIONS

KitchenKapers.com, "Diablo Sandwich Maker 011", www.kitchenkapers.com/diablo-sandwich-maker.html, Aug. 2006 (2 pgs.).

* cited by examiner

*Primary Examiner*—Thor S Campbell
(74) *Attorney, Agent, or Firm*—Stites & Harbison, PLLC; David W. Nagle, Jr.

(57) ABSTRACT

A sandwich maker includes a base and a perforating member. The base includes a base cavity into which a portion of a sheet of dough can be positioned, the base cavity including a plurality of slots positioned in a spaced fashion therein and extending through the base cavity. The perforating member is separably coupled to the base external to the base cavity and moveable between a normally retracted position and an extended position, wherein the perforating member includes a plurality of teeth spaced along the perforating member such that each tooth of the plurality of teeth aligns with a corresponding slot of the plurality of slots, and wherein each tooth is configured to extend into the base cavity via the corresponding slot when the perforating member is in the extended position so as to cut slits in the portion of the sheet of dough positioned within the base cavity.

17 Claims, 12 Drawing Sheets

SANDWICH MAKER

CROSS-REFERENCE TO RELATED APPLICATION

This application is a continuation-in-part application of U.S. patent application Ser. No. 11/708,260; entitled "SANDWICH MAKER," filed Feb. 20, 2007, and is incorporated herein by reference.

BACKGROUND OF THE INVENTION

Stuffed pizza sandwiches are typically in the form of a baked dough shell enclosing some food ingredients generally including one or more of the following: tomato sauce, cheese, spices, vegetables, and meats. To make a stuffed pizza sandwich, an uncooked hollow dough shell or pocket is formed to hold the desired stuffing(s). After the stuffing(s) are introduced into the dough pocket, the dough pocket is sealed along a seam line to capture the stuffing(s) inside. The stuffed sandwich is then baked in an oven.

When making stuffed pizza sandwiches on a commercial scale, it is important that the sandwiches be made in an efficient and uniform manner. As such, several assemblies have been developed for simultaneously forming a plurality of stuffed sandwiches. However, this approach generally requires that multiple sandwiches be made which generally include pre-determined/standard ingredients.

However, in order to attract and maintain consumers in today's highly competitive retail food industry, it is important to customize the ingredients of a stuffed pizza sandwich to meet the unique tastes of an individual consumer. As such, a device which enables efficient and consistent formation of individual stuffed pizza sandwiches to suit the unique tastes of individual customers is desirable. It is also desirable that the device be easily disassembled for cleaning.

BRIEF SUMMARY OF THE INVENTION

One embodiment of the present invention provides a sandwich maker including a base and a perforating member. The base includes a base cavity into which a portion of a sheet of dough can be positioned, the base cavity including a plurality of slots positioned in a spaced fashion therein and extending through the base cavity. The perforating member is separably coupled to the base external to the base cavity and moveable between a normally retracted position and an extended position, wherein the perforating member includes a plurality of teeth spaced along the perforating member such that each tooth of the plurality of teeth aligns with a corresponding slot of the plurality of slots, and wherein each tooth is configured to extend into the base cavity via the corresponding slot when the perforating member is in the extended position so as to cut slits in the portion of the sheet of dough positioned within the base cavity.

DETAILED DESCRIPTION OF THE INVENTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
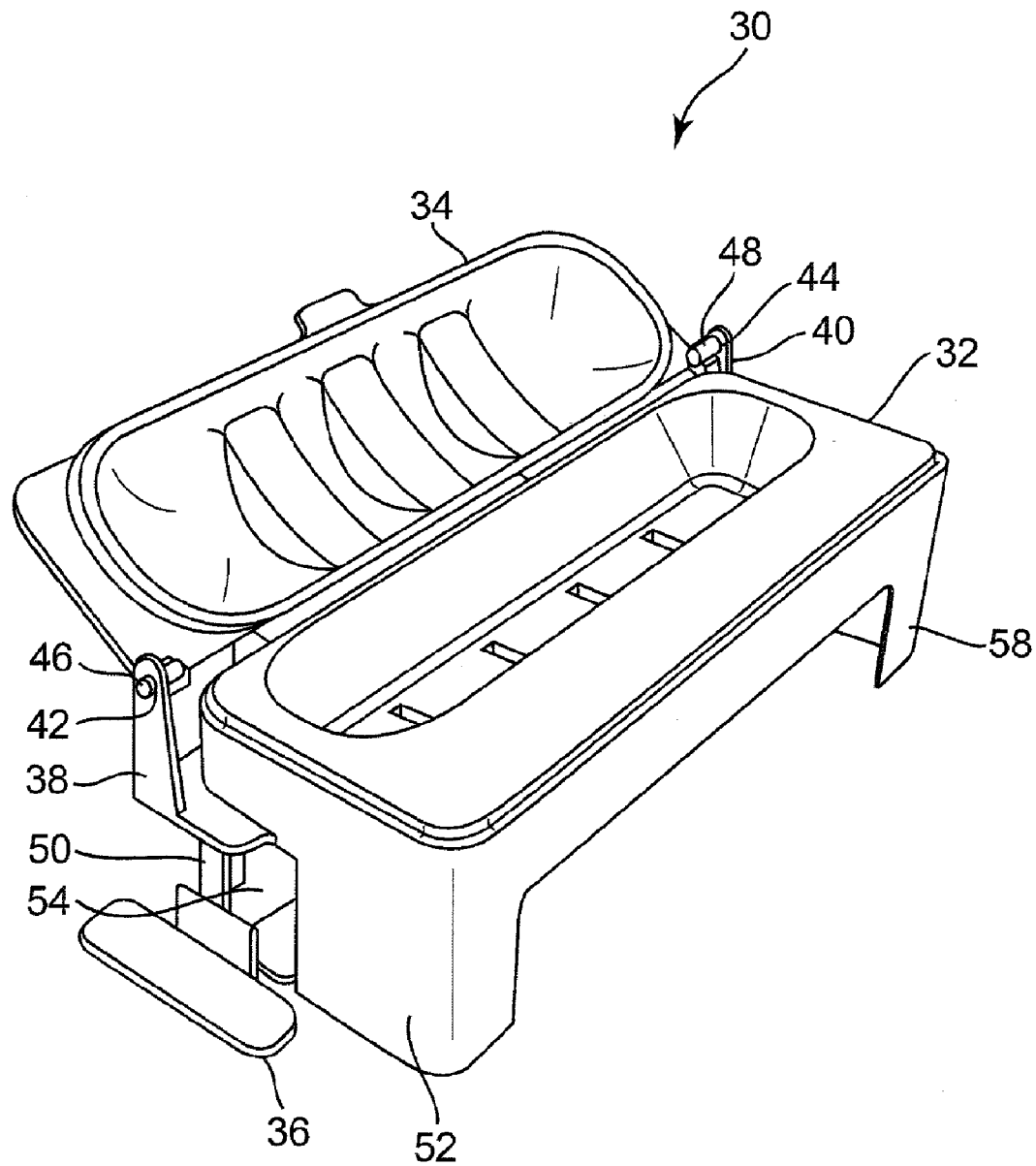
FIG. 1 is a perspective view of one embodiment of a sandwich maker according to the present invention.

FIG. 1 is a perspective view illustrating one embodiment of a portable, hand-operated sandwich maker 30 for forming a stuffed sandwich having a dough shell and a stuffing therein (e.g. meat, cheese, sauce, vegetables). Sandwich maker 30 includes a first shell or base 32, a second shell or lid 34, and a perforating member or bar 36. Base 32 includes a pair of stanchions 38 and 40 having corresponding apertures 42 and 44 which are configured to respectively receive pins 46 and 48 extending from opposite ends of lid 34 in a fashion such that lid 34 can be separably hinged to base 32 and swing between an open position and a closed position relative to base 32. In FIG. 1, it is noted that lid 34 is shown in a partially open position.

Perforating bar 36 is separably retained by base 32 within a first retainer channel 50 formed by a first pair of support legs 52 and 54 and a similar retainer channel 56 formed by a second pair of support legs 58 and 60 on the opposite end of base 32 (see FIGS. 2 and 3 below). As will be described in greater detail below, during operation of sandwich maker 30, perforating bar 36 is moveable within retainer channels 50 and 56 between an extended position and a normally retracted position.

Figure 2:
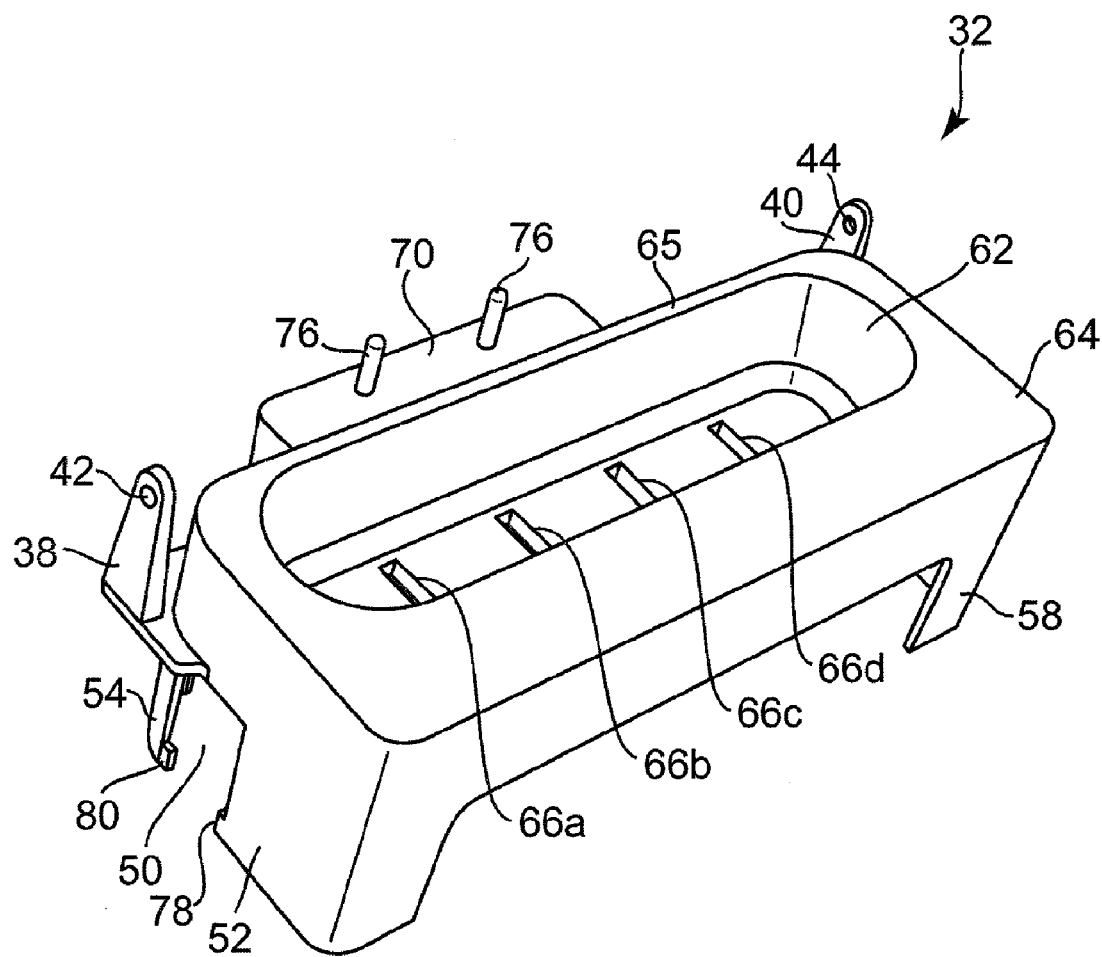
FIG. 2 is a top perspective view of one embodiment of a base of the sandwich maker of FIG. 1.
Figure 3:
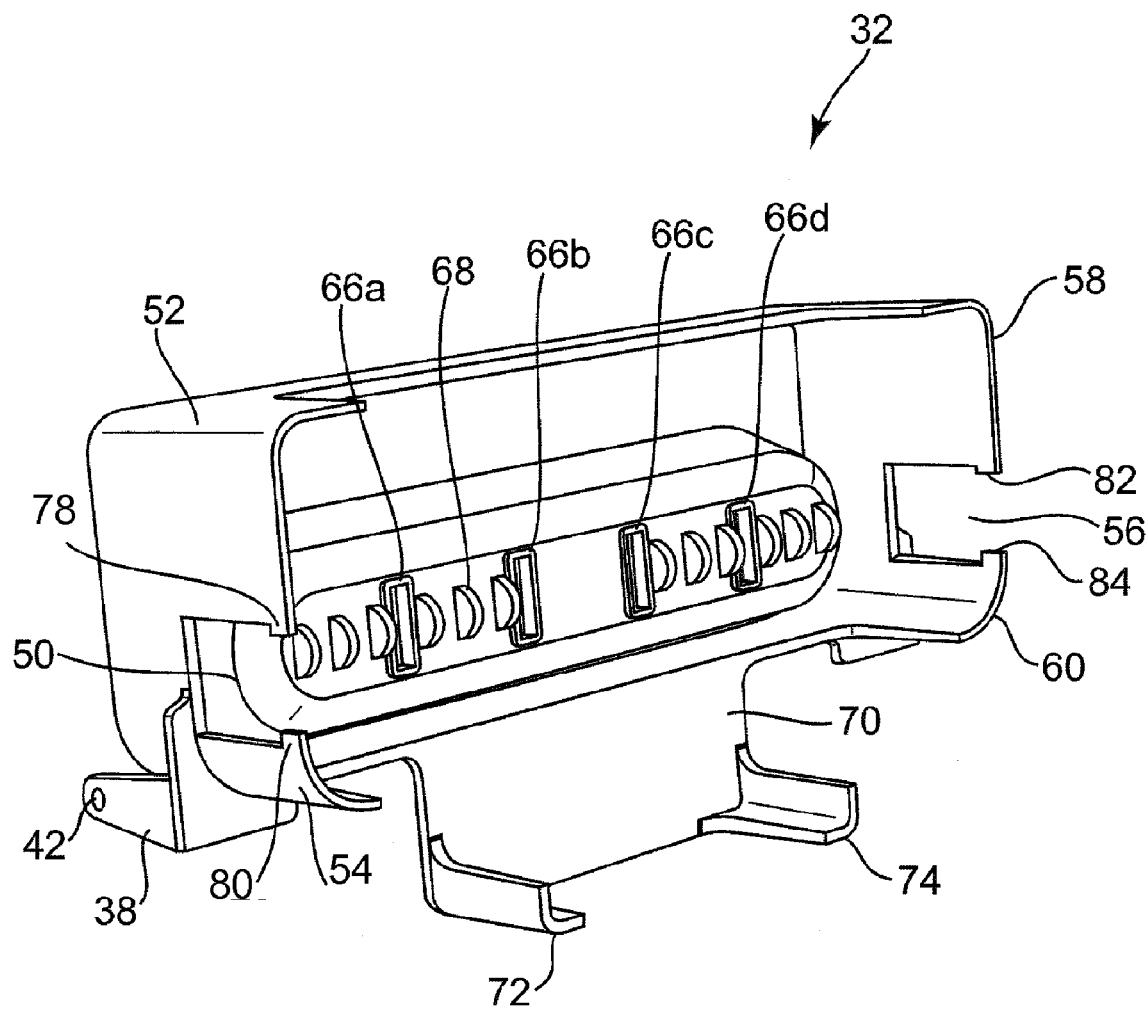
FIG. 3 is a bottom perspective view of the base of FIG. 2.

FIGS. 2 and 3 respectively illustrate top and bottom perspective views of base 32. Base 32 includes a base cavity 62 and a substantially planar surface or deck 64 along one longitudinal edge of base cavity 62 and a ledge 65 extending along the opposite edge between stanchions 38, 40. Base cavity 62 includes a plurality of openings or slots, illustrated as slots 66a-66d, positioned in a spaced fashion along a bottom interior surface thereof and extending through to the exterior. A series of curved ribs, such as illustrated by curved rib 68, extend from and are positioned in a spaced fashion along the underside of base cavity 62 between at least some of the slots 66a-66d. As will be described in greater detail below, curved ribs 68 assist in the operation of perforating bar 36 during the formation of a stuffed sandwich within base cavity 62.

A shelf 70 extends from base 32 between stanchions 38 and 40 and is supported by legs 72 and 74. In one embodiment, support posts 76 extend from shelf 70. Shelf 70 and associated legs 72, 74 provide stability to sandwich maker 30 and, as will be described in greater detail below, support lid 34 when it is in the open position.

As described above, the first pair of support legs 52 and 54 and the second pair of support legs 58 and 60 respectively form retainer channels 50 and 56. Legs 52 and 54 respectively include tabs 78 and 80 and legs 58 and 60 respectively include tabs 82 and 84 such that retainer channels 50 and 56 are narrower at their ends opposite of base cavity 62.

Figure 4:
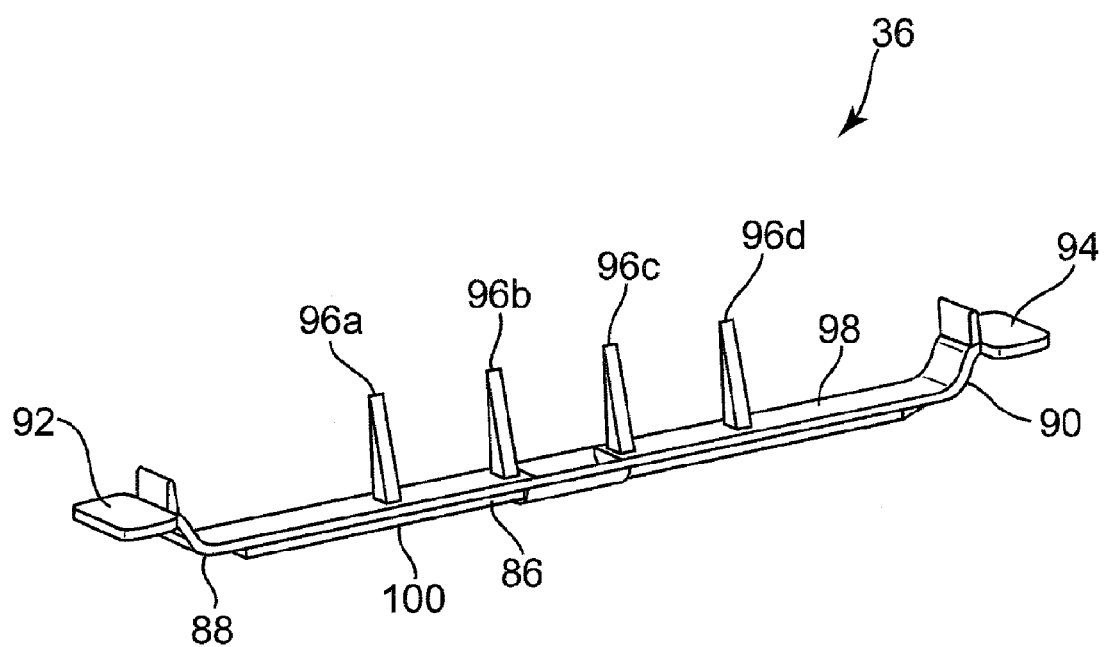
FIG. 4 is a perspective view of one embodiment of a perforating bar of the sandwich maker of FIG. 1.

FIG. 4 is a perspective view illustrating one embodiment of perforating bar 36. Perforating bar 36 includes a bar member 86, with flange members 88 and 90 extending from opposite ends of bar member 86. In one embodiment, as illustrated, flange members 88 and 90 curve upwardly and away from bar member 86. Lifting tabs 92 and 94 respectively extend from flange members 88 and 90. A series of teeth, illustrated as 96a-96d, extend from and are positioned in a spaced fashion along an upper surface 98 of bar member 86. It is noted that, in other embodiments, perforating bar 36 may have more or fewer teeth than the four teeth 96a-96d illustrated by FIG. 4, with the number of corresponding slots 66 in base cavity 62 of base 32 being adjusted accordingly.

With further reference to FIGS. 1-3, when perforating bar 36 is inserted into retainer channels 50 and 56, it is tilted so that a narrow dimension of bar member 86 between flange member 88 and tooth 96a and between flange member 90 and tooth 96d respectively pass between tabs 78, 80 and tabs 82, 84. Teeth 96a-96d are spaced along bar member 86 so as to be aligned with corresponding slots 66a-66d extending through base cavity 62. As mentioned above, perforating bar 36 is moveable within retainer channels 50 and 56 between an extended position and a normally refracted position. When in the retracted position, a lower surface 100 of bar member 86 rests on tabs 78, 80 and tabs 82, 84 of retaining channels 50 and 56 with the tips of teeth 96a-96d being captured within corresponding slots 66a-66d of base cavity 62. In one embodiment, the tips of teeth 96a-96d extend into, but not through, corresponding slots 66a-66d of base cavity 62. Flange member 88 and lifting tab 92, and flange member 90 and lifting tab 94 respectively extend from retainer channels 50 and 56.

Figure 5:
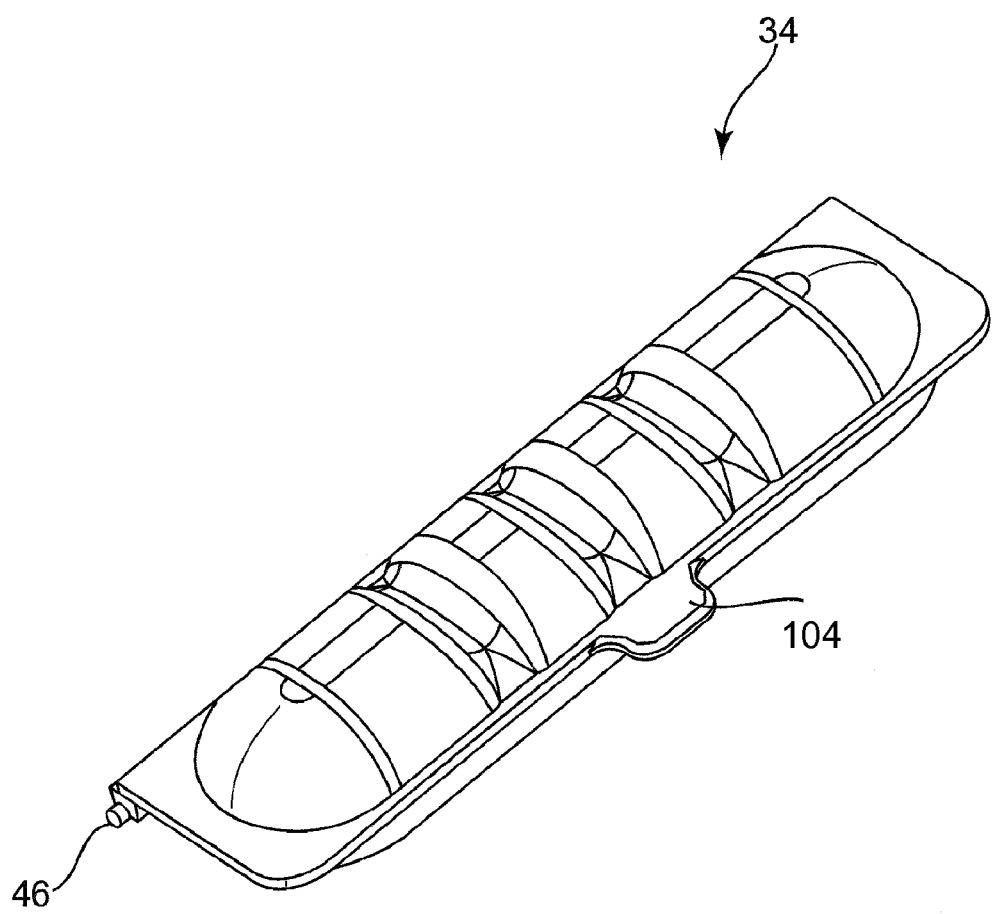
FIG. 5 is a top perspective view of one embodiment of a lid of the sandwich maker of FIG. 1.
Figure 6:
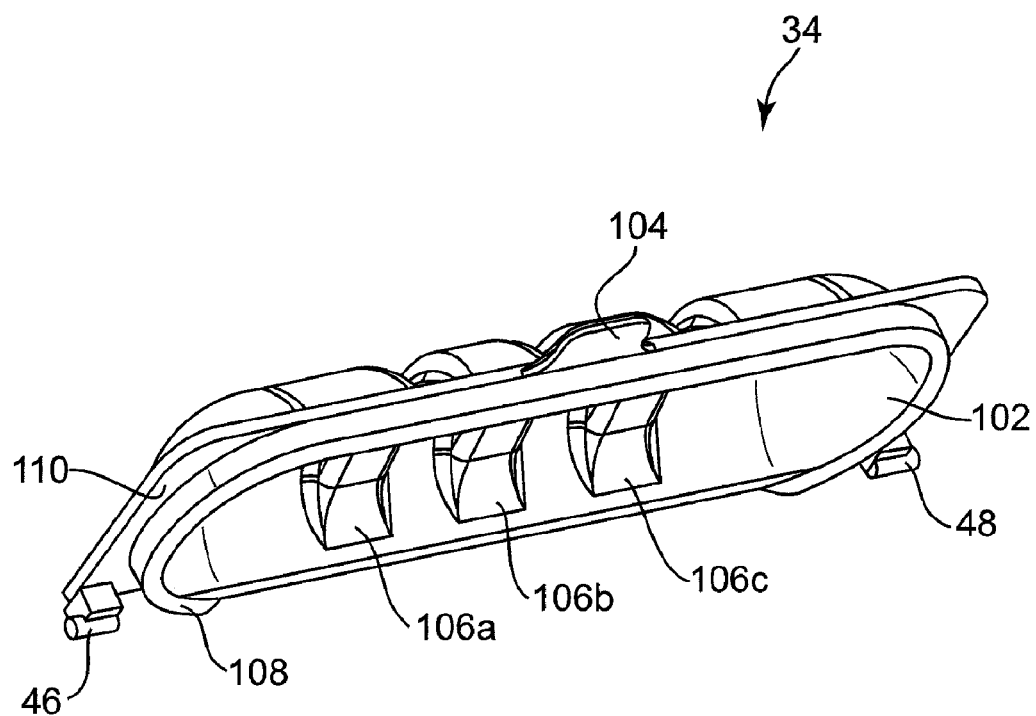
FIG. 6 is a bottom perspective view of the lid of FIG. 5.

FIGS. 5 and 6 respectively illustrate top and bottom perspective views of lid 34. In addition to hinge pins 46 and 48, lid 34 includes a lid cavity 102 and a lifting tab 104. A series of curved ribs, illustrated as 106a-106c, extend into cavity 102 from an upper surface of lid 34. A ridge element 108 extends from a lower surface 110 of lid 34 about the end portions of cavity 102 and between the end portions along an edge of lid cavity 102 opposite hinge pins 46 and 48. It is noted that, in other embodiments, lid cavity 102 may include more or fewer than the three curved ribs 106a-106c illustrated by FIGS. 5 and 6. As will be described in greater detail below, curved ribs 106a-106c restrict movement of a stuffed sandwich within base and lid cavities 62 and 102 during operation of perforating bar 36, and ridge element 108 operates to cut away excess dough from the stuffed sandwich.

A process for operating assembled sandwich maker 30 to make a stuffed sandwich is described generally below by flow diagram 120 of FIG. 7 and with further reference to FIGS. 1-6 above. The process begins at 122, where lid 34 is rotated so as to be in an open position, such that an upper surface of a lid 34 rests on shelf 70. In one embodiment, when in the open position, the upper surface of lid 34 rests on support posts 76. When lid 34 is in the open position, shelf 70 is positioned such that lower surface 110 of lid 34 is substantially parallel with deck 64 of base 32 so that together, base 32 and lid 34 form a substantially continuous and planar dough support surface.

At 124, a user places a sheet of pre-made dough over sandwich maker 30 such that the dough rests on base 32 and open lid 34. In one embodiment, the user substantially centers the dough sheet on base 32 and open lid 34. In one embodiment, the user places the dough into base cavity 62 by lightly lifting the dough so that the dough relaxes and sags into base cavity 62 so as to form a dough pocket, as directly pushing the dough into base cavity 62 may cause the dough to tear.

At 126, the user places desired sandwich ingredients into the dough pocket. It is noted that sandwiches are formed in an upside-down fashion in sandwich maker 30, with the top of the sandwich being proximate to the bottom of base cavity 62. As such, ingredients are placed into the dough pocket in reverse order. For example, where a desired sandwich to be made is a pizza sandwich, in one embodiment, a user may first add cheese, followed by meat, vegetables, and sauce.

At 128, after all desired ingredients have been placed into the dough pocket, the user, using his/her hands, pulls and folds the dough supported by lid 34 over the dough pocket and ingredients therein and onto the dough supported by base 32. It is noted that lid 34 remains in the open position. In one embodiment, the user pulls the dough so that the dough forms a fold line which is substantially parallel with ledge 65 of base 32. In one embodiment, the user pulls the dough supported by lid 32 until ledge 65 of base 32 is exposed so as to ensure that the dough fold line will not be pinched in the hinge between base 32 and lid 34 when lid 34 is closed.

At 130, the user closes lid 34 over the folded sandwich and onto base 32. The user firmly presses down on lid 34 so as to force ridge element 108 through the folded layers of dough and against deck 64 of base 32. As ridge element 108 passes through the dough, it pinches and seals the two layers of dough together, thereby encasing the ingredients within a dough "shell", and trims excess dough. The user then tears away and discards the excess dough. An example of this process is illustrated in greater detail by the partial cross-sectional view of sandwich maker 30 of FIG. 8.

At 132, while pressing down on lid 34, the user gasps lifting tabs 92 and 94 with his/her fingers and pulls perforating bar 36 upward from the retracted position to the extended position such that teeth 96a-96d move upward through corresponding slots 66a-66d into base cavity 62 and penetrate through the dough to create venting slots. The user pulls upward on perforating bar 36 until upper surface 98 contacts curved ribs 68, at which point the user rocks perforating bar 36 back and forth on curved ribs 68 one or more times such that teeth 96a-96d rock back and forth so as to cut and enlarge the venting slots in the dough. An example of this process is also illustrated in greater detail by FIG. 8. Curved ribs 106a-106c in lid 34 function to hold the sandwich in place while the venting process is carried out. The user then releases perforating bar 36 so that it returns to the retracted position.

At 134, the user returns lid 34 to the open position. At 134, the user holds lid 34 in the open position against shelf 70, holds perforating bar 36 in the retracted position via lifting tabs 92 and 94, and flips sandwich maker 30 over to release the stuffed sandwich from base cavity 62 and onto a desired surface, such as a baking sheet, such that the vented side of the sandwich is facing upward.

The above described process of 122-134 is repeated for each stuffed sandwich. Sandwich maker 30 is cleaned by separating lid 34 and perforating bar 36 from base 32 and washing.

Figure 7:
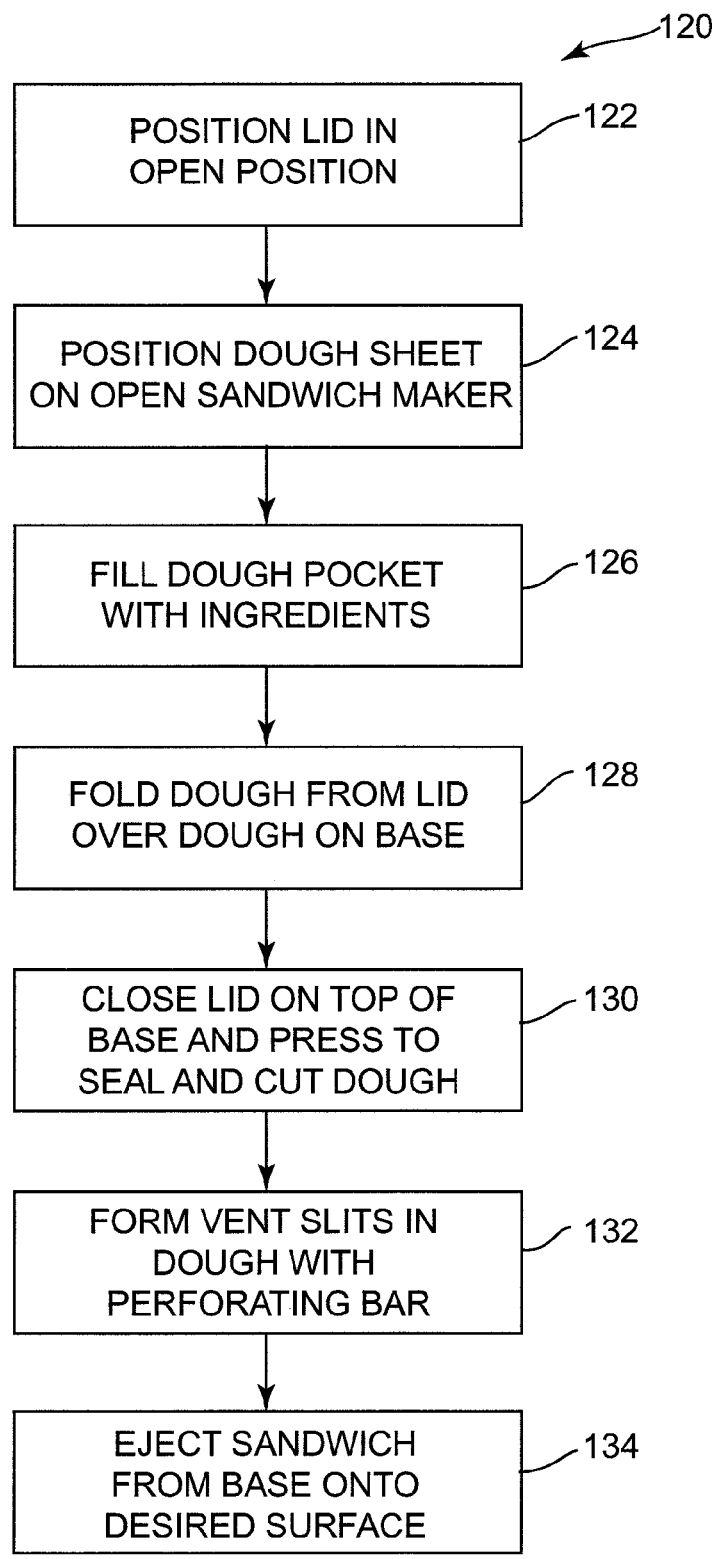
FIG. 7 is a flow diagram illustrating one embodiment of a process for operating the sandwich maker of FIG. 1.
Figure 8:
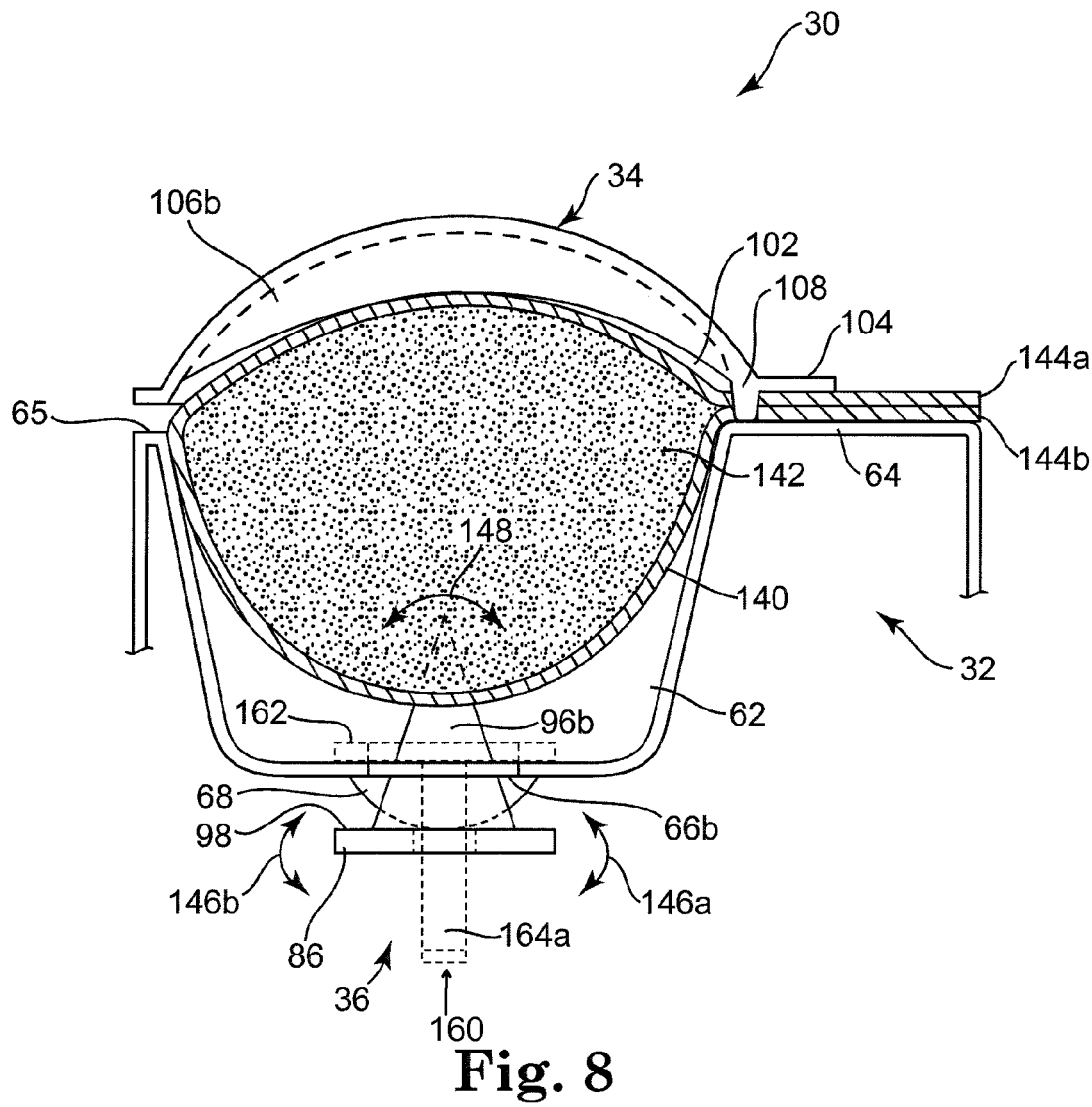
FIG. 8 is a partial cross-sectional view of one embodiment of the sandwich maker of FIG. 1.

FIG. 8 is a cross-sectional view illustrating portions of one embodiment of sandwich maker 30 with lid 34 in a closed position wherein base and lid cavities 62 and 102 are juxtaposed with ridge element 108 in contact with deck 64 of base 32. As illustrated, FIG. 8 corresponds generally to 130 and 132 of the process described above by flow diagram 120 of FIG. 7. A stuffed sandwich comprising a dough shell 140 filled with ingredients 142 is illustrated within base and lid cavities 62 and 102, with two layers of excess dough 144a, 144b remaining on deck 64 after being cut by ridge element 108 from a sheet of contiguous dough used to form shell 140. In FIG. 8, it is noted that ridge element 108 is tapered so as to form a blade-like edge that cuts through dough layers 144a, 144b and contacts deck 64.

As illustrated by FIG. 8, perforating bar 36 is in the extended position with upper surface 98 against curved ribs 68. In the extended position, teeth 96a-96d extend through corresponding slots 66a-66d, through dough shell 140 and into ingredients 142, as illustrated by tooth 96b and slot 66b in FIG. 8. In this position, perforating bar 36 is rocked back and forth against curved rib 68, as illustrated by rotational arrows 146a, 146b, to cause tooth 96b to rotate back and forth within base cavity 62, as illustrated by rotational arrow 148, so as to cut and enlarge slots through dough shell 140.

Figure 9:
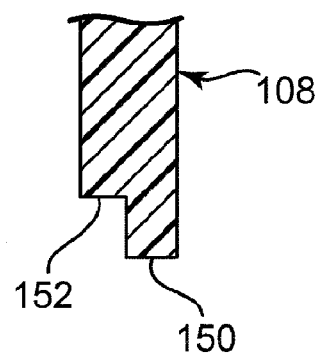
FIG. 9 is a cross-sectional view of one embodiment of a ridge element of a lid of the sandwich maker of FIG. 1.

In one embodiment, as illustrated in FIG. 9, which is a cross-sectional view of the ridge element 108 of the lid 34, and with further reference to FIG. 6, the ridge element 108 of lid 34 has a stepped profile with an outside edge 150 extending further from lower surface 110 of lid 34 than an inside edge 152 adjacent to lid cavity 102. In operation, outside edge 150 acts as a knife to cut through dough layers 144a and 144b, and inside edge 152 crimps dough layers 144a and 144b together to seal ingredients 142 within dough shell 140.

Figure 10:
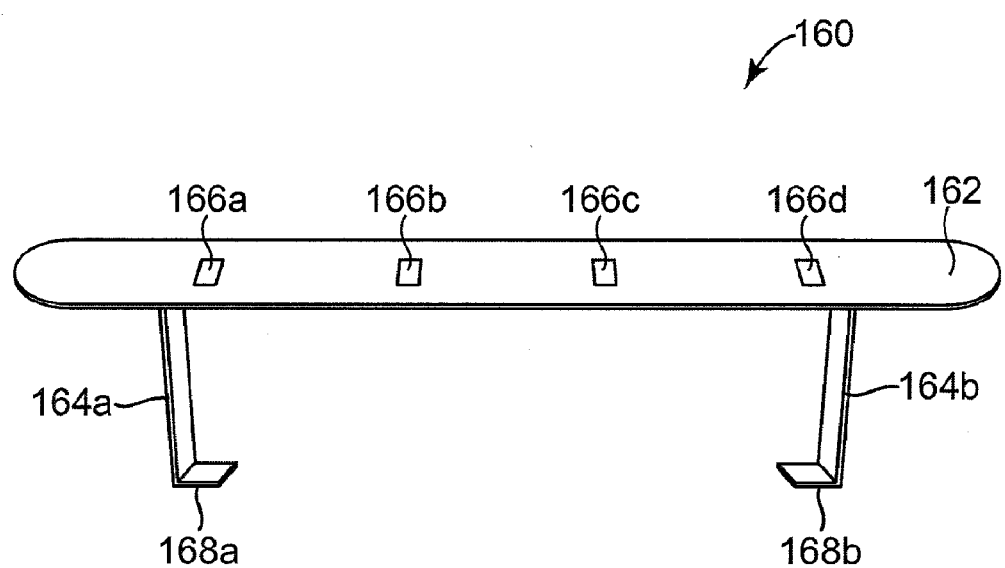
FIG. 10 is a perspective view of one embodiment of an ejector for use with a sandwich maker according to embodiments of the present invention.

In some instances, it is desired to forcefully eject the sealed dough shell 140 from sandwich maker 30. Therefore, in one embodiment, as illustrated with reference to FIGS. 10-13, sandwich maker 30 further includes an ejector element 160. Referring to FIG. 10, ejector element 160 includes a plate 162, a pair of shafts 164a and 164b extending from plate 162, and a series of slots 166a, 166b, 166c, and 166d extending through plate 162, wherein slots 166a-166d are sized and spaced so as to align with slots 66a-66d extending through the bottom of base cavity 62. In one embodiment, as illustrated, shafts 164a and 164b respectively include retainer tabs 168a and 168b on ends opposite of plate 162.

Figure 11:
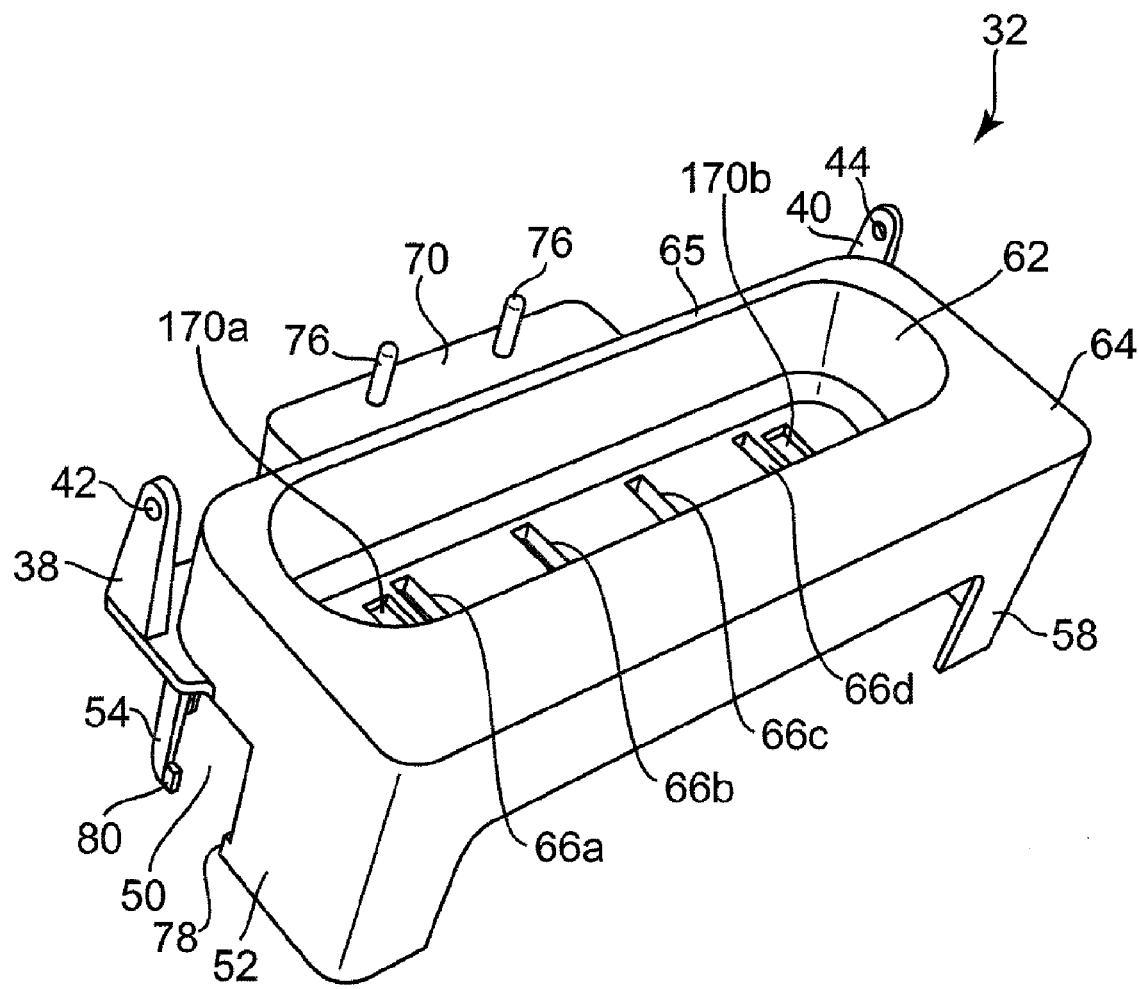
FIG. 11 is a top perspective view of one embodiment of a base of a sandwich maker according to the present invention.
Figure 12:
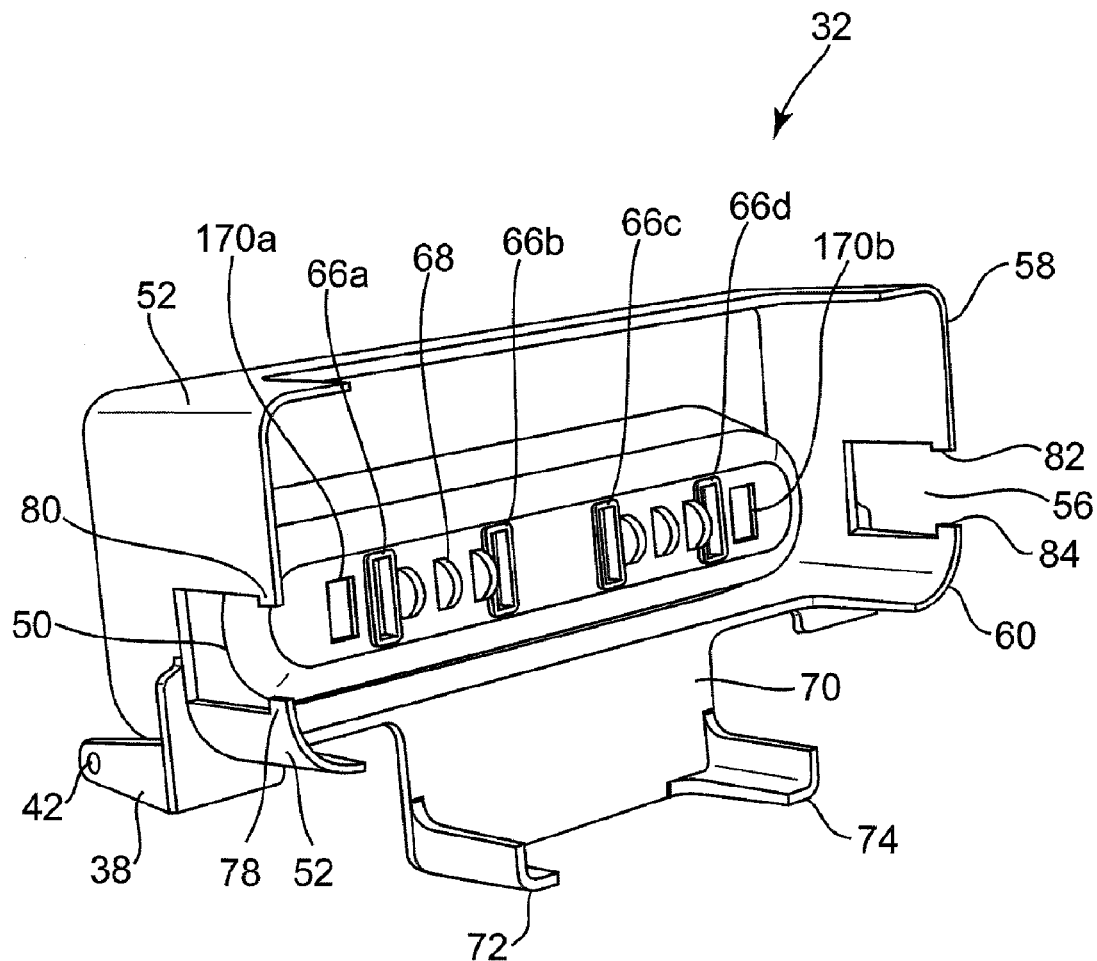
FIG. 12 is a bottom perspective view of the base of FIG. 10.
Figure 13:
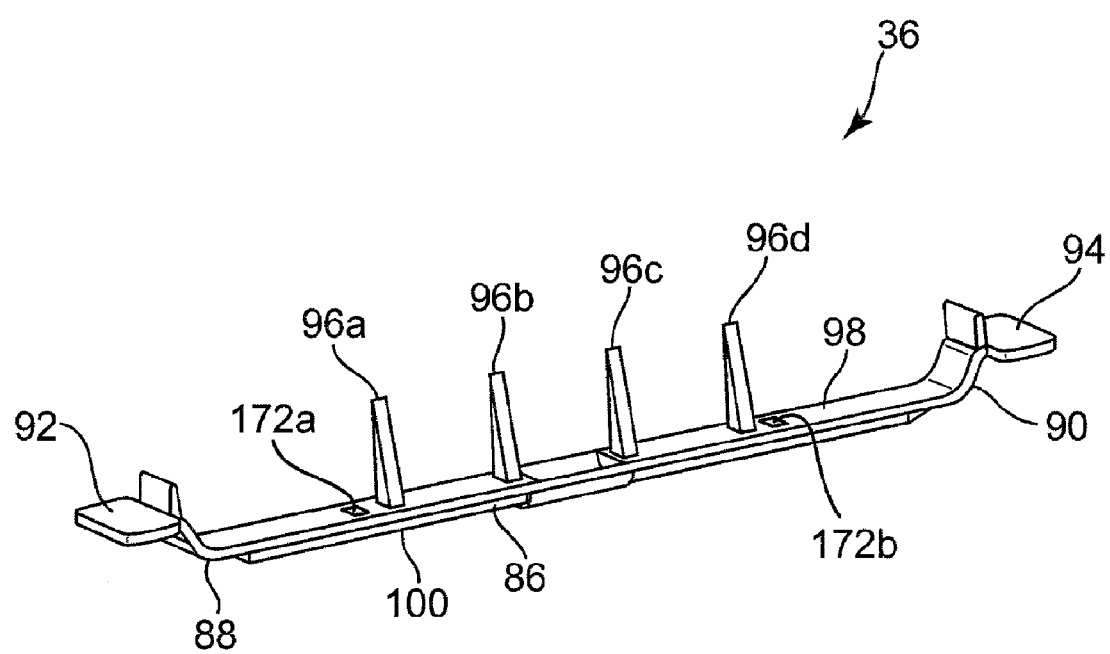
FIG. 13 is a perspective view of one embodiment of a perforating bar for use with a sandwich maker according to embodiments of the present invention.

In such an embodiment, as illustrated by FIGS. 11 and 12, which are top and bottom perspective views, respectively, of base 32, base cavity 62 includes a pair of slots 170a and 170b which are sized and positioned so as to be aligned with shafts 164a, 164b of ejector element 160. Similarly, as illustrated by FIG. 13, perforating bar 36 includes a pair of slots 172a and 172b which are also sized and positioned so as to be aligned with shafts 164a and 164b of ejector element 160.

When sandwich maker 30 is assembled, ejector element 160 is positioned within base cavity 62 such that shafts 164a and 164b respectively extend through slots 170a, 170b of base cavity 62 and slots 172a, 172b of perforating bar 36 in a fashion such that ejector element 160 is moveable between an extended position and a normally refracted position. When in the retracted position, plate 162 rests in the bottom of base cavity 62 such that slots 166a-166d in plate 162 are aligned with slots 66a-66d of base cavity 62 and teeth 96a-96d of perforating bar 36 extend through corresponding slots 166a-166d and 66a-66d. With reference to FIG. 8, ejector element 160 is illustrated in dashed lines and as being in the refracted position with plate 162 resting on the bottom of base cavity 62 and shaft 164a extending through base cavity 62 and through bar member 86 of perforating bar 36.

With reference to FIG. 7, when making a stuffed sandwich in sandwich maker 30, ejector element 160 remains in the retracted position and rests on the bottom of cavity 62 during steps 122 through 132. In one embodiment, after placing lid 34 in the open position, a user reaches beneath base 32 and pushes ejector element 160 from its retracted position into its extended position into cavity 62 via shafts 164a, 164b and corresponding retainer tabs 168a, 168b so as to push and release a completed sandwich which might otherwise be stuck within cavity 62. In one embodiment, a user pushes ejector element 160 into cavity 62 after sandwich maker 30 has been flipped over. Retainer tabs 168a and 168b maintain shafts 164a, 164b of ejector element 160 within corresponding slots 172a, 172b and slots 170a, 170b of perforating bar 36 and base cavity 62.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A sandwich maker comprising:
   a base having a base cavity into which a portion of a sheet of dough can be positioned, the base cavity including a plurality of slots positioned in a spaced fashion therein and extending through the base cavity; and
   a perforating member separably coupled to the base external to the base cavity and moveable between a normally retracted position and an extended position, wherein the perforating member includes a plurality of teeth spaced along the perforating member such that each tooth of the plurality of teeth aligns with a corresponding slot of the plurality of slots, and wherein each tooth is configured to extend into the base cavity via the corresponding slot when the perforating member is in the extended position so as to cut slits in the portion of the sheet of dough positioned within the base cavity.

2. The sandwich maker of claim 1, further including a plurality of rounded surface elements extending from an underside of the base cavity, wherein the perforating member is configured to contact and rock on the rounded surface elements when in the extended position so as to rock the teeth within the base cavity and enlarge the slits.

3. The sandwich maker of claim 2, wherein the rounded surface elements comprise a plurality of arcuate rib elements positioned in a spaced fashion between at least some of the slots.

4. The sandwich maker of claim 1, wherein tips of the teeth are captured by the corresponding slots when the perforating member is in the retracted position.

5. The sandwich maker of claim 1, wherein the perforating member includes a lifting tab extending from each longitudinal end thereof and which extends beyond a corresponding longitudinal end of the base.

6. The sandwich maker of claim 1, wherein the base further includes a pair of support legs extending from each longitudinal end thereof, with each pair of support legs forming a retainer channel, wherein the retainer channels together are configured to separably retain the perforating member to the base, and wherein the perforating member is configured to slide within the retainer channels between the retracted position and extended position.

7. The sandwich maker of claim 1, further including a lid separably hinged to the base and configured to swing along a longitudinal edge of the base between an open position and a closed position with the base, the lid including a lid cavity having a rim element extending around a portion of a perimeter of the lid cavity, wherein the lid and base together are configured to receive and support the sheet of dough when the lid is in the open position, wherein the lid cavity and base cavities are juxtaposed when the lid is in the closed position and the rim element contacts a deck around a portion of a perimeter of the base cavity such that the rim element squeezes and cuts through overlapping layers of the dough sheet so as to seal a dough shell formed thereby and remove excess dough.

8. The sandwich maker of claim 7, wherein the rim element extends around longitudinal ends of the lid cavity and along a longitudinal side of the lid cavity opposite a longitudinal side of the lid along which the lid is hinged to the base.

9. The sandwich maker of claim 7, wherein the rim element has a tapered profile which forms a blade-like edge which contacts the deck.

10. The sandwich maker of claim 7, wherein the rim element has a stepped profile having an outer edge extending further from the perimeter of the lid cavity than an inner edge, wherein the outer edge serves as a cutter and the inner edge serves as a crimper.

11. The sandwich maker of claim 7, wherein the perforating member is configured to be moved to the extended position when the lid is in the closed position, and wherein the lid cavity includes a plurality of curved ribs extending into the lid cavity and configured to secure the dough shell as the perforating member is moved from the retracted position to the extended position and cuts slits in the dough shell.

12. The sandwich maker of claim 7, wherein the base includes a shelf extending from a longitudinal side along which the lid is hinged to the base, wherein the shelf is configured to support the lid when the lid is in the open position.

13. The sandwich maker of claim 12, wherein the shelf supports the lid such that the lid and base form a substantially planar surface for supporting the sheet of dough.

14. The sandwich maker of claim 1, further comprising an ejector including a plate element configured to be positioned within the base cavity and a plurality of shafts extending from the plate element and configured to extend through corresponding ejector slots in the base cavity and in the perforating member, wherein the plate element includes a plurality of slots configured to align with the plurality of slots extending through the base cavity, and wherein the ejector is moveable between a normally retracted position where the plate element rests on a bottom of the base cavity and an extended position away from the bottom so as to push a sandwich from the base cavity.

15. The sandwich maker of claim 14, wherein the base, the perforating member, the lid, and the ejector are each injection molded using a material comprising a polyester and polycarbonate blend.

16. A portable, hand-operated device for making a stuffed pizza sandwich comprising:

a base having a base cavity including a plurality of slots positioned in a spaced fashion therein and extending through the base cavity;

a lid separably hinged to the base and configured to swing along a longitudinal edge of the base between an open position and a closed position with the base, the lid including a lid cavity having a rim element extending around a portion of a perimeter of the lid cavity, wherein the lid and base together are configured to receive and support a dough sheet when the lid is in the open position, wherein a portion of the dough sheet is positioned within the base cavity so as to receive stuffing ingredients; and wherein the lid cavity and base cavities are juxtaposed when the lid is in the closed position and the rim element contacts a deck around a portion of a perimeter of the base cavity such that the rim element squeezes and cuts through overlapping layers of the dough sheet after the dough sheet is folded onto the base so as to seal stuffing ingredients with a dough shell formed thereby;

a perforating member separably coupled to the base external to the base cavity and moveable between a normally retracted position and an extended position, wherein the perforating member includes a plurality of teeth spaced along the perforating member such that each tooth of the plurality of teeth aligns with a corresponding slot of the plurality of slots, and wherein each tooth is configured to extend into the base cavity via the corresponding slot when the perforating member is in the extended position so as to cut slits in the portion of the sheet of dough positioned within the base cavity; and an ejector including a plate element configured to be positioned within the base cavity and a plurality of shafts extending from the plate element and configured to extend through corresponding ejector slots in the base cavity and in the perforating member, wherein the plate element includes a plurality of slots configured to align with the plurality of slots extending through the base cavity, and wherein the ejector is moveable between a normally retracted position where the plate element rests on a bottom of the base cavity and an extended position away from the bottom so as to push a sandwich from the base cavity.

17. The device of claim 16, including a plurality of rounded surface elements extending from an underside of the base cavity, wherein the perforating member is configured to contact and rock on the rounded surface elements when in the extended position so as to rock the teeth within the base cavity and enlarge the slits.

\* \* \* \* \*